United States Patent [19]

Suzuki et al.

[11] Patent Number: 4,938,085
[45] Date of Patent: Jul. 3, 1990

[54] POWER TRANSMISSION SYSTEM IN A TRACTOR

[75] Inventors: Takanori Suzuki; Kenji Nakamura; Satoshi Matsuzawa, all of Saitama, Japan

[73] Assignee: Honda giken Kogyo Kabushiki Kaisha, Tokyo, Japan

[21] Appl. No.: 207,416

[22] Filed: Jun. 16, 1988

[30] Foreign Application Priority Data

Jun. 30, 1987 [JP] Japan ................... 62-160988
Jun. 30, 1987 [JP] Japan ................... 62-160992
Jan. 6, 1988 [JP] Japan ..................... 63-324

[51] Int. Cl.⁵ .............................................. B60K 17/00
[52] U.S. Cl. ..................................... 74/15.2; 74/15.4; 74/15.8
[58] Field of Search ................. 74/15.2, 15.4, 15.8, 74/15.84, 15.86

[56] References Cited

U.S. PATENT DOCUMENTS

| 4,245,514 | 1/1981 | Meyahara et al. | 74/15.84 |
| 4,294,130 | 10/1981 | Kisaka et al. | 74/15.4 |
| 4,667,536 | 5/1987 | Ehrlinger et al. | 74/15.4 |
| 4,727,759 | 3/1988 | Yamasha et al. | 74/15.2 |

FOREIGN PATENT DOCUMENTS

| 153196A2 | 8/1985 | European Pat. Off. | |
| 905930 | 3/1954 | Fed. Rep. of Germany | 74/15.2 |
| 2518528 | 10/1977 | Fed. Rep. of Germany | |
| 54-31860 | 3/1979 | Japan | 74/15.4 |
| 54-37015 | 11/1979 | Japan | |
| 57-109022 | 7/1982 | Japan | |
| 58-78829 | 5/1983 | Japan | 74/15.4 |
| 62-3009 | 1/1987 | Japan | |
| 776786 | 6/1957 | United Kingdom | |
| 852348 | 10/1960 | United Kingdom | |
| 886326 | 1/1962 | United Kingdom | |
| 888130 | 1/1962 | United Kingdom | |
| 909159 | 10/1962 | United Kingdom | 74/15.4 |
| 2096251A | 10/1982 | United Kingdom | |
| 2129385 | 5/1984 | United Kingdom | 74/15.4 |

Primary Examiner—Leslie A. Braun
Assistant Examiner—Scott Anchell
Attorney, Agent, or Firm—Lyon & Lyon

[57] ABSTRACT

A power transmission system in a tractor having a travelling drive sub-system for driving wheels and a PTO drive sub-system for driving working machines. A transmission case is provided with a single input shaft connected to an engine, and the travelling drive sub-system and the PTO drive sub-system are respectively led out from the input shaft separately. The travelling drive sub-system is connected to the input shaft via a main clutch, and is composed of a multi-stage speed-changer having a plurality of speed-changer clutches. The PTO drive sub-system is connected to the input shaft via a PTO clutch that is different from the main clutch, and at the rear portion of the PTO drive sub-system is provided a power transmission switching apparatus which can selectively transmit power to a plurality of PTO shafts.

27 Claims, 6 Drawing Sheets

POWER TRANSMISSION SYSTEM IN A TRACTOR

BACKGROUND OF THE INVENTION

The present invention relates to a power transmission system in an agricultural tractor.

In an agricultural tractor, an engine is mounted on a front portion of the vehicle body, and on the rear portion of the vehicle body is mounted a transmission case. An output shaft of the engine is connected to an input shaft of the transmission case via a propeller shaft. Within the transmission case is contained a speed change mechanism, hence the engine power input to the above-mentioned input shaft is transmitted at a changed speed to an output shaft via the aforementioned speed change mechanism, and wheels are driven by the last-mentioned output shaft. In the transmission case is further provided a power take-out shaft (hereinafter called PTO shaft) adapted to take out power for driving a working machine connected to the tractor, the input engine power being also transmitted to this PTO shaft at a changed speed, and the power being transmitted to the working machine by the intermediary of the PTO shaft.

In a travelling drive sub-system for driving the wheels is interposed a main clutch so that, upon speed change operations or the like, the travelling drive sub-system can be arbitrarily cut off from the engine. Normally the above-mentioned main clutch is disposed in the proximity of the engine. Here it is desired that the PTO drive sub-system for transmitting power to the working machine via the above-described PTO shaft should operate independently of the aforementioned travelling drive sub-system, that is, regardless of the travelling state of the tractor.

Accordingly, in order to connect the PTO drive sub-system to the engine without the intermediary of the aforementioned main clutch in the travelling drive sub-system, the power transmission system in the tractor was constructed in the prior art, for instance, as shown in FIG. 1 wherein reference numeral E designates an engine mounted on a front portion of a vehicle body, and an output shaft 01 of that engine is disengageably connected to a hollow tubular shaft 04 via a main clutch 03 within a clutch housing 02. The shaft 04 extends into a transmission case 05 in the rear, and within the transmission case 05, a speed-changer consisting of gear trains $T_1, \ldots, T_4$ is formed between the shaft 04 and another shaft 06 disposed adjacently and in parallel thereto. The gears on the side of the shaft 06 in the respective gear trains are loosely fitted around the shaft 06 so as to be freely rotatable and, by selectively connecting any one of these gears to the shaft 06 by means of a selector 07, rotation of the shaft 04 can be transmitted to the shaft 06 at a desired speed change ratio. The shaft 06 is connected via a final shaft 07' to a differential device 08, and wheels are driven by that differential device. In other words, a travelling drive sub-system 09 in this power transmission system is composed of the main clutch 03, the shaft 04, the gear train T, the shaft 06 and the final shaft 07'.

A PTO drive sub-system 010 in this power transmission system is constructed in the following manner. A shaft 011 is directly connected to the output shaft 01 of the engine E, and this shaft 011 extends through the interior of the above-mentioned hollow shaft 04 up to the rear portion of the transmission case 05, and is connected to a shaft 013 via a PTO clutch 012. Between the shaft 013 and another shaft 014 is provided a speed changer similar to the speed changer in the above-described travelling drive sub-system, so that rotation of the shaft 013 may be transmitted at a changed speed to the shaft 014 and further transmitted to a PTO shaft 015. In this way, as the PTO drive sub-system 010 is directly connected to the engine E without the intermediary of the travelling drive sub-system, the PTO shaft can be independently driven by the engine E regardless of the travelling state of the tractor.

In the conventional power transmission system for use in a tractor in the prior art as described above, since the main clutch is provided on the side of the engine, it is necessary to provide a special clutch. In addition it is difficult to extend a directly coupled shaft of an engine that does not pass through the above-mentioned main clutch up to the interior of the transmission case, and to that end, it is necessary to employ a complicated shaft structure such that the shaft 04 in the travelling drive sub-system connected to the main clutch is formed as a hollow shaft and the directly coupled shaft 011 of the engine is made to pass through that hollow shaft as described above.

Furthermore, the above-described directly coupled shaft 011 of the engine must to be formed as a long shaft extending from the engine E up to the rear portion of the transmission case 05.

SUMMARY OF THE INVENTION

Therefore, the present invention has it as an object to provide a power transmission system for use in a tractor in which a PTO drive sub-system can be operated regardless of a travelling drive sub-system, and which is relatively simple in structure and small-sized as a whole.

The power transmission system for use in a tractor according to the present invention comprises a single input shaft provided within a transmission case and connected to an engine, a main shaft for travelling use disposed within the transmission case extending in a longitudinal direction, a main clutch provided at the front end of the main shaft and operatively connected to the input shaft for connecting or disconnecting a power transmission route from the input shaft to the main shaft, a counter shaft for travelling use disposed either on the upper side or on the lower side of the main shaft in parallel thereto, a plurality of speed changers associated with clutches disposed between the main shaft and the counter shaft so as to be selectively operated, a PTO transmission shaft disposed parallel to the main shaft on the opposite side thereof from the counter shaft and a PTO clutch provided on the PTO shaft and operatively connected to the input shaft for connecting or disconnecting a power transmission route from the input shaft to the PTO shaft.

According to the present invention, since the main clutch is connected to the input shaft and disposed within the transmission case, a clutch housing is not independently required. Furthermore, owing to the fact that the travelling drive sub-system and the PTO drive sub-system are extend in parallel outwardly from the single input shaft connected to the engine, the PTO drive sub-system can be operated independently of the travelling drive sub-system without employing a double inner/outer shaft structure as is the case with the prior art, and the shaft of the PTO drive sub-system can be made short.

In addition, according to the present invention, in a power transmission system of a tractor provided with a plurality of PTO shafts for respectively driving a plurality of working machines mounted to a vehicle body, within a transmission case is disposed a PTO transmission shaft connected via a PTO clutch to an input shaft of the above-mentioned transmission case, and power is transmitted to the plurality of PTO shafts through the PTO transmission shaft.

According to the present invention having the aforementioned feature, since the respective PTO shafts are all driven from a single PTO shaft connected via the clutch to the input shaft driven by the engine, any additional shaft or belt is not required and the drive system becomes simple.

In addition, by connecting or disconnecting the above-mentioned clutch, the PTO drive sub-system can be connected to or disconnected from the engine as a whole. Consequently, and since the PTO drive sub-system and the travelling drive sub-system are independent of each other, the driving states of the respective PTO shafts are not influenced by the travelling state of the tractor. Thus when the working machines are not in use, the PTO drive sub-system can be disconnected from the engine to avoid loss of engine power caused by idling of the shafts in that drive sub-system.

Furthermore, by providing on the aforementioned PTO transmission shaft a power transmission switching apparatus which can selectively transmit power to the respective PTO shafts, power transmission to the above-described PTO shafts can be switched among various combinations with a simple and compact apparatus.

BRIEF DESCRIPTION OF THE DRAWINGS

FIGS. 5, 5(a) and 5(b) are a developed longitudinal cross-section view showing a power transmission system according to another preferred embodiment of the present invention taken along the planes successively connecting the axes of the respective shafts and then developed.

DETAILED DESCRIPTION OF THE PREFERRED EMBODIMENTS

Figure 4:
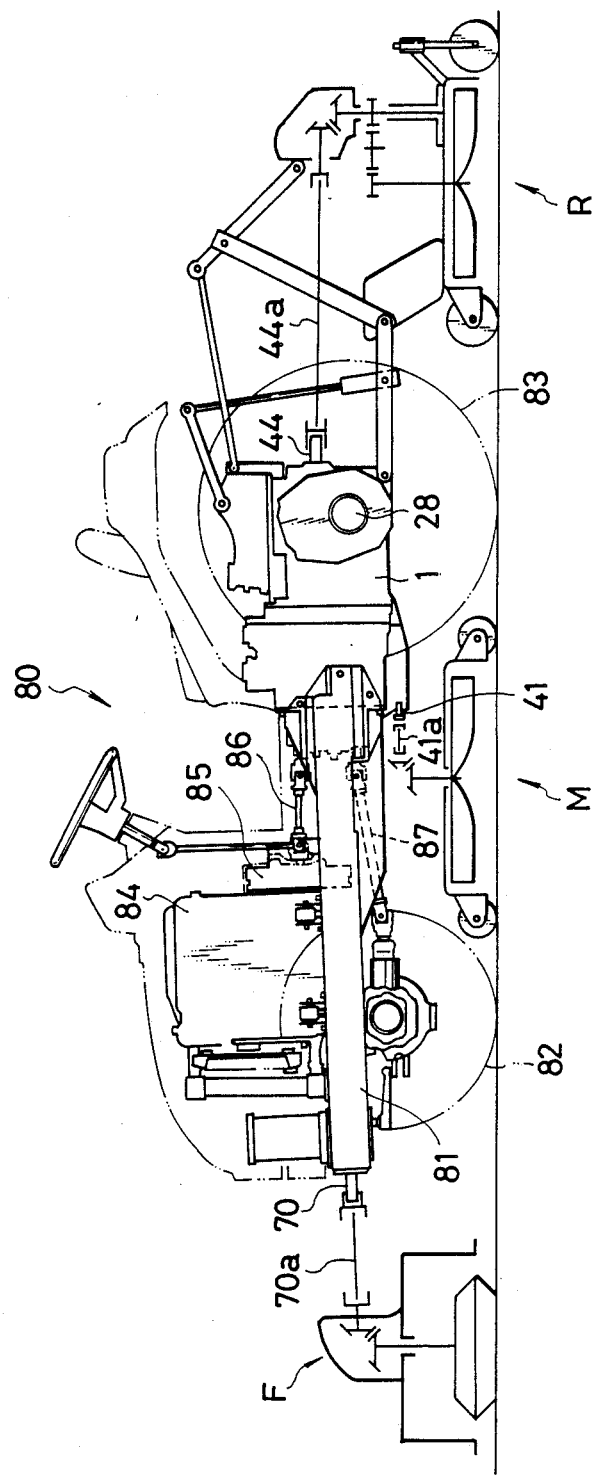
FIG. 4 is a general side view of a tractor embodying the present invention.

A tractor 80 embodying the present invention is generally shown in a side view in FIG. 4, in which front wheels 82 are mounted to a front portion of a vehicle body frame 81 and rear wheels 83 are mounted to a rear portion of the same. On a front upper portion of the vehicle body frame is mounted an engine 84, and an output shaft of the engine 84 is connected to an input shaft of a transmission case 1 via a flywheel 85 and a propeller shaft 86. Within the transmission case 1 is contained a power transmission mechanism, as will be described later, wherein the engine power input to the above-described input shaft is output to a rear axle 28 and a front wheel drive shaft 87 after it has been appropriately speed-changed through the power transmission mechanism.

From the transmission case 1 also project three PTO shafts consisting of a front PTO shaft 70, a middle PTO shaft 41 and a rear PTO shaft 44 whereby engine power input to the above-described input shaft is transmitted also to these PTO shafts. To the respective PTO shafts are connected a front working machine F, a middle working machine M and a rear working machine R, respectively, through working machine drive shafts 70a, 41a and 44a. In the illustrated embodiment, the front working machine F and the middle working machine M are mowers, while the rear working machine R is a sweeper. High grasses are roughly mown by the front working machine F, then the grasses are mown for finishing by the middle working machine M, and the mown grasses are gathered by the rear working machine R. As a matter of course, the mode of use of the tractor 80 should not be limited to the above-described mode, but it is possible to connect various kinds of working machines to all or a part of the respective PTO shafts 70, 41 and 44 as combined in various combinations to perform works adapted to the respective objects.

Figure 1:
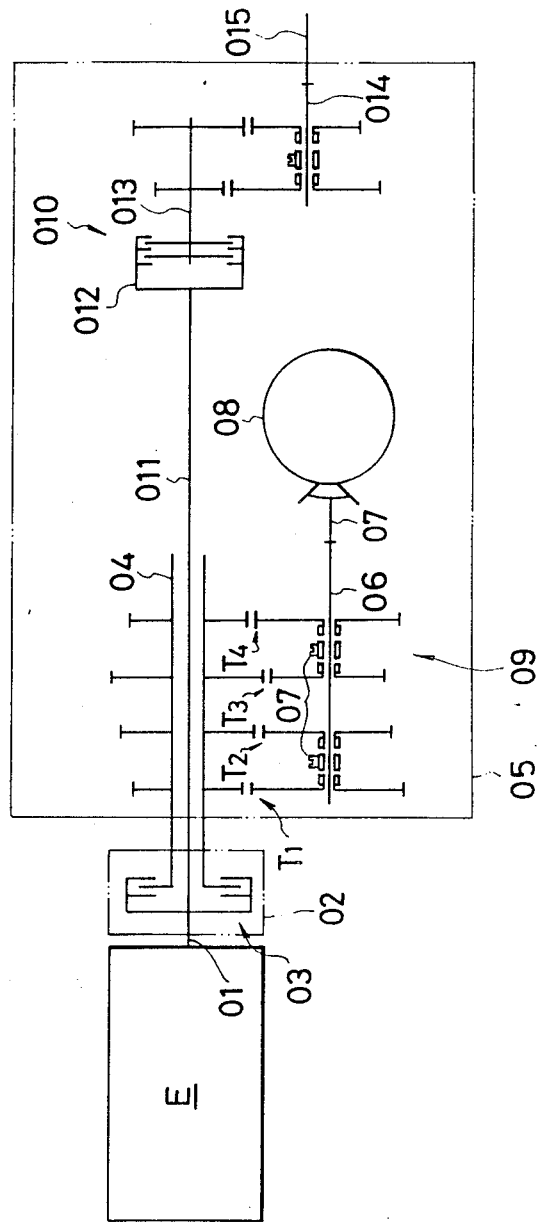
FIG. 1 is a system diagram showing one example of a power transmission system in a tractor in the prior art.
Figure 2:
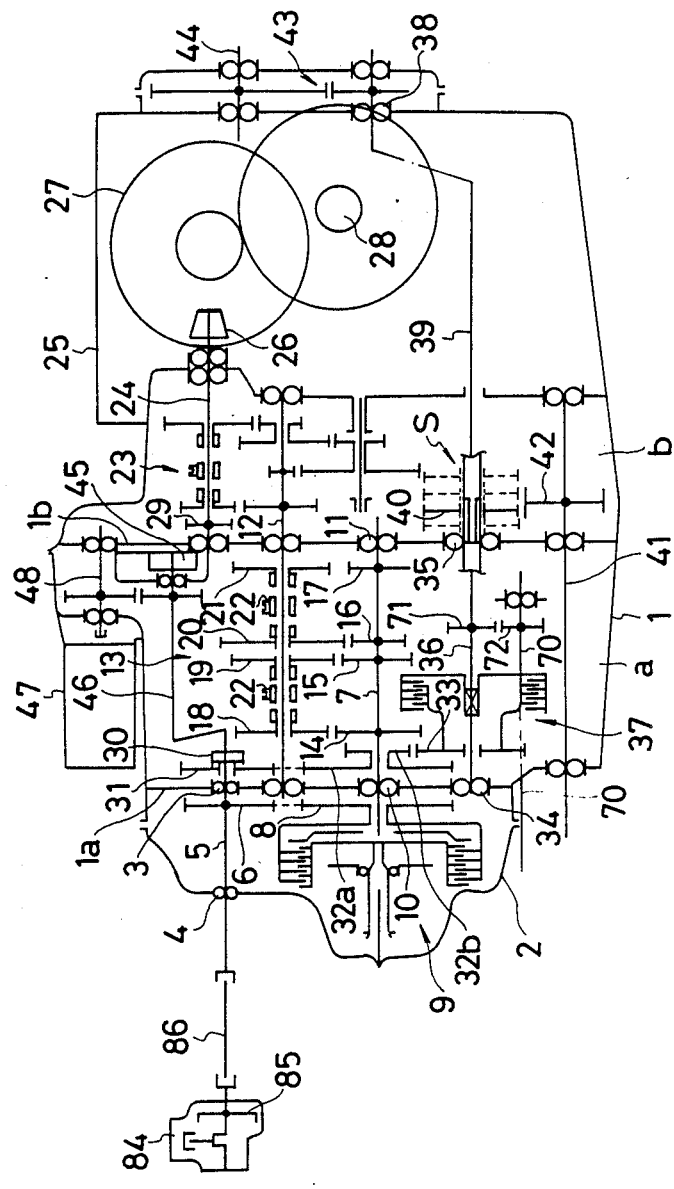
FIG. 2 is a system diagram showing a power transmission system according to one preferred embodiment of the present invention.

FIG. 2 is a system diagram of the power transmission mechanism within the transmission case 1 in the tractor 80. At the front end of the transmission case 1 is integrally mounted a main clutch case 2, and an input shaft 5 is supported for rotation from a front wall 1a of the transmission case 1 and the main clutch case 2 via bearings 3 and 4, respectively. The input shaft 5 is connected to the engine 84 via the flywheel 85 and the propeller shaft 86 as described above, and it is always rotating upon operation of the engine. A gear 6 is fixedly secured to the input shaft 5, and this gear 6 is always meshed with a gear 8 loosely fitted around a main shaft 7. Rotation of the gear 8 is transmitted to the main shaft 7 via a main clutch 9 of wet multi-disc type disposed within the main clutch case 2. The main shaft 7 is rotatably supported from the front wall 1a and a middle wall 1b of the transmission case 1 via bearings 10 and 11. Within the transmission case 1 is also disposed a counter shaft 12 that is rotatably supported similarly from the front wall 1a and middle wall 1b adjacent to the main shaft 7. A main speed changer 13 is provided between these shafts 7 and 12.

The main speed changer 13 is composed of a 3rd-speed drive gear 14, a 2nd-speed drive gear 15, 1st-speed drive gear 16 and a back drive gear 17, which are fixedly mounted on the main shaft 7, and a 3rd-speed driven gear 18, a 2nd-speed driven gear 19 and a 1st-speed driven gear 20 meshed with the aforementioned gears 14, 15 and 16, respectively, and a back driven gear 21 meshed with the above-described back drive gear 17 via an idle. The driven gears 18 through 21 are all loosely fitted around the counter shaft 12, and rotation of the main shaft 7 is transmitted to the counter shaft 12 at a desired speed-change ratio by connecting any one of the above-described driven gears to the counter shaft 12 by the intermediary of a selector 22 that is rotatable integrally with and slidable in the axial direction of the counter shaft 12.

The transmission case 1 is partitioned into a main speed-changer case a and a subsidiary speed-changer case b by the above-mentioned middle wall 1b. The counter shaft 12 extends beyond the middle wall 1b into the subsidiary speed-changer case b, wherein it is connected to a final shaft 24 via a subsidiary speed-changer 23 which consists of a gear mechanism similar to the above-described main speed-changer 13, so that the rotation of the counter shaft 12 is further speed-changed and transmitted to the final shaft 24. The final shaft 24 extends into a rear case 25 additionally provided at the rear end of the transmission case 1 where an output bevel gear 26 provided at the rear end of that shaft 24 is meshed with a larger input bevel gear of a differential device 27. In this way, the rear wheel 83"; are driven via the differential device 27 and rear axle 28. The final shaft 24 also drives the front wheel drive shaft 87 (FIG. 4) via a gear 29.

The above-described power transmission route branched from the input shaft 5 by the gear 6 and reaching the final shaft 24, forms a travelling drive sub-system for driving the wheels of the tractor.

Furthermore, another drive sub-system, that is, a PTO drive system, is branched from the input shaft 5 in parallel relationship to the above-described travelling drive sub-system. More particularly, to the input shaft 5 is mounted a PTO drive gear 31 via a one-way clutch 30, and power for driving a PTO shaft is taken out through this gear 31. The one-way clutch 30 allows torque transmission from the input shaft 5 to the gear 31, but it prevents torque transmission from the gear 31 to the input shaft 5. The gear 31 is meshed with an intermediate gear 32a loosely fitted around the main shaft 7 so as to be freely rotatable. Intermediate gear 32a drives another intermediate gear 32b that is integral with the aforementioned intermediate gear 32a and that meshes with a PTO driven gear 33. This gear 33 is loosely fitted around a PTO transmission shaft 36 that is supported from the above-mentioned front wall 1a and middle wall 1b via bearings 34 and 35, respectively, and is also connected via a PTO clutch 37 to the PTO transmission shaft 36.

The front PTO shaft 70 is disposed in parallel to the PTO transmission shaft 36, and a drive gear 71 fixedly provided on the shaft 36 and a driven gear 72 fixedly provided on the shaft 70 are meshed with each other. Separately from the above-mentioned front PTO shaft 70, a middle PTO shaft 41 is disposed likewise in parallel to the PTO transmission shaft 36. Furthermore, at the rear of the PTO transmission shaft 36 and on the same axis as the shaft 36 is disposed a rear PTO transmission shaft 39 which has its front end rotatably supported by the rear end of the shaft 36 and its rear end pivotably supported from the rear wall of the rear case 25 via a bearing 38.

At the rear end portion of the PTO transmission shaft 36 is provided a power transmission switching device S. This switching device S consists of a selector gear 40 that is slidable in the axial direction such that the respective shafts 36 and 39 are adapted to be connected together by the aforementioned selector gear 40 being positioned across the PTO transmission shaft 36 and the rear PTO transmission shaft 39. The selector gear 40 is adapted to be engaged with and disengaged from a gear 42 mounted on a middle PTO shaft 41. The selector gear 40 can occupy four positions consisting of the leftmost position where it is not meshed with the gear 42 nor is it engaged with the rear PTO transmission shaft 39; the middle left position where it is meshed with the gear 42 but not engaged with the rear PTO transmission shaft 39; the middle right position where it is meshed with the gear 42 and is also engaged with the rear PTO transmission shaft 39; and the rightmost position where it is not meshed with the gear 42 but is engaged with the rear PTO transmission shaft 39. Depending upon these positions of the selector gear 40, the rotation of the PTO transmission shaft 36 can be transmitted to the front PTO shaft 70 only, to both the front PTO shaft 70 and the middle PTO shaft 41, to all the front PTO shaft 70, the middle PTO shaft 41 and the rear PTO transmission shaft 39, or to both the front PTO shaft 70 and the rear PTO transmission shaft 39.

The front PTO shaft 70 projects forwardly from the transmission case 1 and transmits power to a working machine F mounted to the front portion of the vehicle body of the tractor through a working machine drive shaft 70a (FIG. 4) connected to the shaft 70 via a universal joint. Likewise, the middle PTO shaft 41 transmits power to a working machine M mounted to the middle portion of the vehicle body of the tractor. The rear PTO transmission shaft 39 is connected via a gear device 43 to a rear PTO shaft 44, and this rear PTO shaft 44 transmits power to the working machine R mounted to the rear portion of the vehicle body of the tractor.

Reference numeral 45 designates a hydraulic pump for feeding lubricant oil to the respective lubricating portions within the transmission case 1, and this pump is driven by the input shaft 5 via a pump drive shaft 46. Reference numeral 47 designates a hydraulic pump for applying a hydraulic pressure to a hydraulic cylinder not shown for vertically moving a working machine, and this pump is driven by another pump drive shaft 48 gear-coupled to the above-mentioned pump drive shaft 46.

Figure 3:
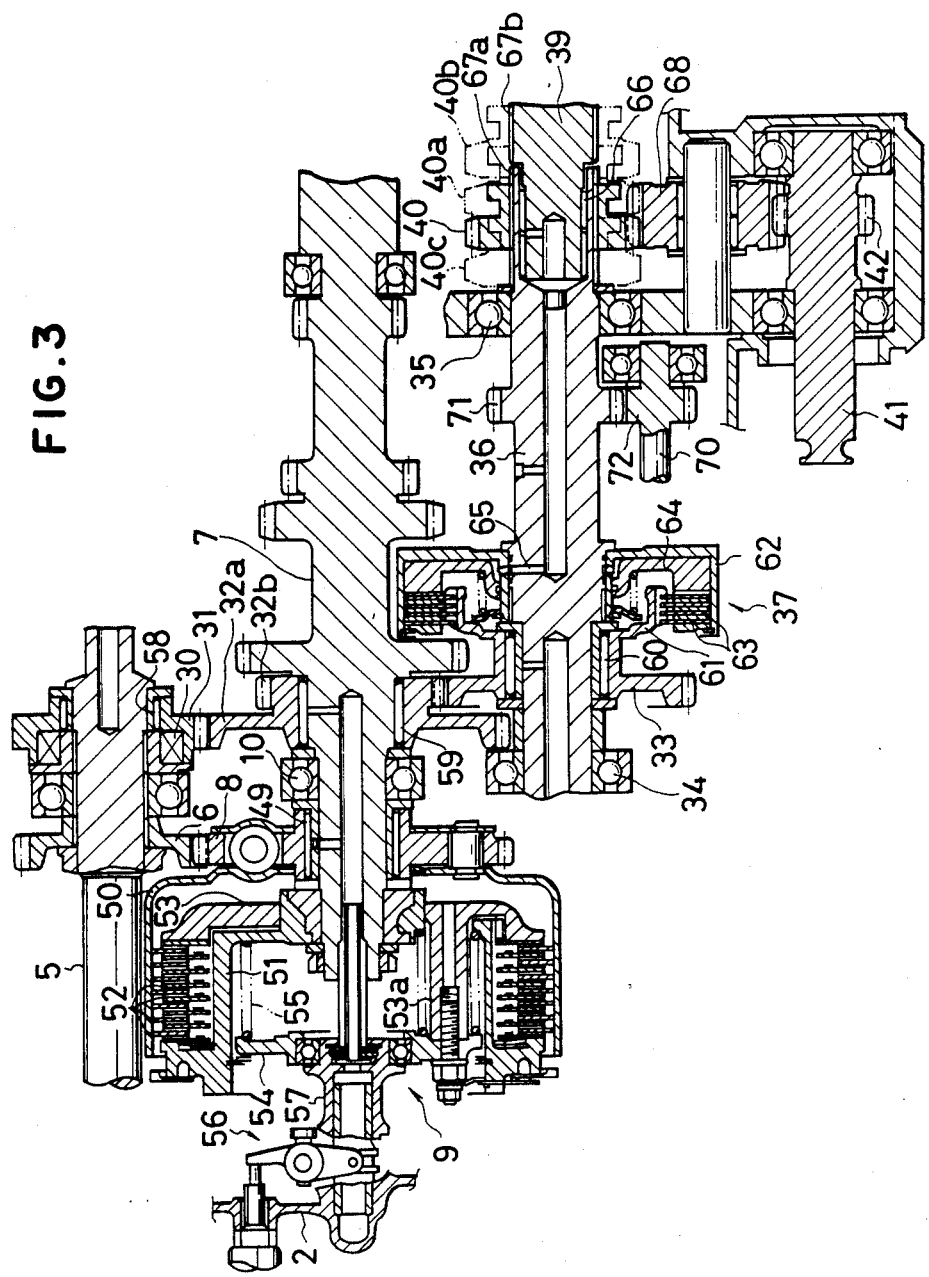
FIG. 3 is a cross-section view showing in more detail a structure of part of the power transmission system in FIG. 2.

FIG. 3 is a cross-section view showing in more detail the structure of a part of the above-described travelling drive sub-system and PTO drive sub-system. Similar component parts in FIGS. 2 and 3 are given like reference numerals. Now supplementing the previous explanation with reference to FIG. 3, the gear 8 that is always meshed with the gear 6 mounted on the input shaft 5 is loosely fitted around the main shaft 7 via a needle bearing 49 so as to be freely rotatable, and a clutch outer 50 of the main clutch 9 is connected to the same gear 8. The main clutch 9 is a multi-plate wet type clutch, whose clutch inner 51 is mounted to the front end of the main shaft 7 so as to be rotatable integrally therewith. In the clutch outer 50 and the clutch inner 51, respectively, are provided a large number of clutch plates 52 which are arrayed alternately so as to be displaceable in the axial direction. Around a boss of the clutch inner 51 is fitted a pressure plate 53 so as to be displaceable in the axial direction. A pressure plate 53 is connected to a lifter plate 54 via a projecting piece 53a, which projects forwardly penetrating through an opening provided in the clutch inner 51. Between the clutch lifter plate 54 and the clutch inner 51 is interposed a spring 55, hence the pressure plate 53 is made to press the clutch plates 52 by the resilient force of the spring 55, and the clutch plates 52 are made to press each other, resulting in connection of the main clutch 9. In this way engine power is transmitted from the input shaft 5 through the main clutch 9 to the main shaft 7. If an operation member, such as a pedal provided on the vehicle body, is operated, a shaft 57 is made to move backwardly (rightwardly as viewed in FIG. 3) via an actuation mechanism 56 linked to the operation member, and as the lifter plate 54 also moves jointly with the shaft 57, the pressure plate 53 moves backwardly and the main clutch 9 is disconnected.

The gear 31 referred to previously, is loosely fitted around the input shaft 5 via a needle bearing 58, and is also coupled to the input shaft 5 via the one-way clutch 30. The intermediate gear 32a meshed with this gear 31 is rotatably supported on the main shaft 7 via a needle bearing 59 jointly with the other intermediate gear 32b formed integrally therewith, and the gear 33 meshed with the intermediate gear 32b is loosely fitted around the PTO transmission shaft 36 via a needle bearing 60. A clutch inner 61 of the PTO clutch 37 is formed integrally with the gear 33, and an clutch outer 62 of the same clutch 37 is fixedly secured to the PTO transmission shaft 36. On the inner circumferential surface of the clutch outer 62 and the outer circumferential surface of the clutch inner 61, respectively, are provided alternately disposed clutch plates 63 that are movable in a displaceable manner in the axial direction. As a result of an operation member 64 being made to press the clutch plates 63 by hydraulic pressure applied to the backside of the member 64 through an oil passageway 65, the clutch plates 63 press each other, resulting in connection of the PTO clutch 37. In this way, and rotation of the gear 33 is transmitted via the PTO clutch 37 to the PTO transmission shaft 36.

To the PTO transmission shaft 36 is coupled a front PTO shaft 70 through gears 71 and 72. At the rear end portion of the PTO transmission shaft 36 is rotatably fitted the front end of the rear PTO transmission shaft 39 via a needle bearing 66. Splines splines 67a and 67b are notched on the circumferential surfaces which have the same diameter. The selector gear 40 is slidably engaged with these splines 67a and 67b.

Between the gear 42 provided on the middle PTO shaft 41 and the selector gear 40 is interposed an intermediate gear 68 whose face width gear 68 is about twice as large as the face width of the selector gear 40. When the selector gear 40 is engaged with the spline 67a only and is meshed with the intermediate gear 68 as shown by solid lines in FIG. 3, rotation of the PTO transmission shaft 36 is transmitted to only the front PTO shaft 70 coupled to that shaft 36 via the gears 71 and 72, and the middle PTO shaft 41. When, however, the selector gear 40 is engaged with both the spline 67a and the spline 67b and is meshed with the intermediate gear 68 as shown by dash lines 40a, the rotation of the PTO transmission shaft 36 is transmitted all the front PTO shaft 70, the middle PTO shaft 41 and the rear PTO transmission shaft 39. If the selector gear 40 is displaced further backwardly to release meshing with the intermediate gear 68, it occupies the position to be engaged with both the splines 67a and the spline 67b, as shown by dash lines 40b, and the rotation of the PTO transmission shaft 36 is transmitted to only the front PTO shaft 70 and the rear PTO transmission shaft 39.

When the selector gear 40 is slidably moved forwardly to the foremost position and the meshing with the intermediate gear 68 is released as shown by dash lines 40c, the rotation of the PTO transmission shaft 36 is transmitted to only the front PTO shaft 70.

In the illustrated embodiment described above, within the transmission case 1 the travelling drive subsystem and the PTO drive sub-system are branched, respectively via the gears 6 and 31 in parallel with each other from the single input shaft 5 that is driven by the engine, and these respective sub-systems are adapted to be connected to the above-mentioned input shaft 5 by the intermediary of the main clutch 9 and the PTO clutch 37, respectively. Accordingly, the power transmission through the travelling drive sub-system and the power transmission through the PTO drive sub-system are effected independently of each other, hence the driving condition of a working machine by the PTO shaft would not be influenced by the travelling condition of the tractor. Moreover, when the working machines are not used, the PTO drive sub-system can be perfectly disconnected from the engine.

Furthermore, by means of the power transmission switching apparatus S having an extremely simple structure in which the selector gear 40 is slidably splineengaged with both the PTO transmission shaft 36 and the rear PTO transmission shaft 39, transmission of engine power can be switched to be preset in 4 ways, including (1) transmission of power to the front PTO shaft 70 only, (2) transmission of power to the front PTO shaft 70 and to the middle PTO shaft 41, (3) transmission of power to the front PTO shaft 70, to the middle PTO shaft 41 and to the rear PTO transmission of power shaft 39, and (4) transmission to the front PTO shaft and to the rear PTO transmission shaft 39. Thus the power transmission system can be efficiently adapted to various modes of use of a tractor.

While description has been made above in connection with a tractor provided with three, i.e., front, middle and rear PTO shafts, the three PTO shafts are not always required, but, instead, it is possible to apply the present invention to a tractor provided with, for instance, only two, i.e., middle and rear PTO shafts.

Now another preferred embodiment of the present invention will be described with reference to FIGS. 5 and 6. In this preferred embodiment also, the transmission case 1 is partitioned into a main speed-changer case a and a subsidiary speed-changer case b, and a main clutch case 2 is integrally mounted at the front end of the transmission case 1. Engine power is transmitted from an input shaft 5 to a main shaft 7 for travelling use through gears 6 and 8 and a multi-plate wet type main clutch 9 or, and on the other hand, it is transmitted to a PTO transmission shaft 36 via a one-way clutch 30, a PTO drive gear 31, an intermediate gear 32 loosely fitted around the main shaft 7, a PTO driven gear 33 and a PTO clutch 37. The above-described construction is quite the same as that shown in FIG. 3.

On he rear portion of the travelling main shaft 7 are rotatably fitted and mounted a back drive gear 119 and a 1st-speed drive gear 120 while a 2nd-speed drive gear 121 and a 3rd-speed drive gear 122 are fixedly secured to the front portion thereof. A travelling main counter shaft 123 is rotatably supported obliquely above the travelling main shaft 7 (see FIG. 6) in parallel to the main shaft 7. On this travelling main counter shaft 123 are integrally formed a back driven gear 124, a 1st-speed driven gear 125, and while a 2nd-speed driven gear 126 and a 3rd-speed driven gear 127 are rotatably mounted thereon. The back driven gear 124 is coupled to the back drive gear 119 via a back idle gear 128. The 1st-speed driven gear 125, the 2nd-speed driven gear 126 and the 3rd-speed driven gear 127 are respectively meshed with the 1st-speed drive gear 120, the 2nd-speed drive gear 121 and the 3rd-speed drive gear 122.

On the travelling main shaft 7 are disposed a back travelling hydraulic clutch 129 and a 1st-speed hydraulic clutch 130 adjacent to the back drive gear 119 and the 1st-speed drive gear 120, respectively. Likewise, on the travelling main counter shaft 123 are disposed a 2nd-speed hydraulic clutch 131 and a 3rd-speed hydraulic clutch 132 adjacent to the 2nd-speed driven gear 126 and the 3rd-speed driven gear 127, respectively. The respective clutch inners 129a, 130a, 131a and 132a of the back travelling hydraulic clutch 129, the 1st-speed hydraulic clutch 130, 2nd-speed hydraulic clutch 131 and the 3rd-speed hydraulic clutch 132 are integrally coupled with the back drive gear 119, the 1st-speed drive gear 120, the 2nd-speed driven gear 126 and the 3rd-speed driven gear 127, respectively. Accordingly, by connecting any one of the back travelling hydraulic clutch 129, the 1st-speed hydraulic clutch 130, the 2nd-speed hydraulic clutch 131 or the 3rd-speed hydraulic clutch 132, the travelling main counter shaft 123 is rotationally driven into a back travelling state, a 1st-speed travelling state, a second-speed travelling state or a 3rd-speed travelling state.

The front end of a travelling subsidiary counter shaft 134 in a multi-stage gear type travelling subsidiary speed-changer 133 is integrally spline-fitted in the rear end portion of the travelling main counter shaft 123, while the rear end of the travelling subsidiary counter shaft 134 is rotatably supported from a rear wall 1c of the transmission case 1 via a bearing. On the travelling subsidiary counter shaft 134 are integrally formed a subsidiary 1st-speed drive gear 135, a subsidiary 2nd-speed drive gear 136 and a subsidiary 3rd-speed drive gear 137 at its rear, middle and front portions, respectively. Behind the subsidiary 1st-speed drive gear 135 is rotatably fitted an idle drive gear 138.

Under the travelling subsidiary counter shaft 134 are provided an idle shaft 139 and a rear wheel drive shaft 140, which are rotatably supported from the middle wall 1b and the rear wall 1c of the transmission case 1. Around the idle shaft 134 are rotatably fitted idle gears 141 and 142, respectively. On the rear wheel drive shaft 140 are rotatably mounted a subsidiary 1st-speed driven gear 143 and a subsidiary 3rd-speed driven gear 145 at central and front portions of the shaft 140, respectively. Between these subsidiary driven gears is mounted by spline-fitting a subsidiary 1st-speed shift gear 144. Reference mumeral 146 designates a front wheel drive gear that is integrally mounted by fitting on the rear wheel drive shaft 140 at the rear of the subsidiary 1st-speed driven gear 143. A large diameter portion 141a of the idle gear 141 is meshed with the subsidiary 1st-speed drive gear 135 on the travelling subsidiary counter shaft 134, while a smaller diameter portion 141b of the same idle gear 141 is meshed with a larger diameter portion 138a of the idle drive gear 138. A larger diameter portion 142a of the idle gear 142 is meshed with the front wheel drive gear 146, while a smaller diameter portion 142b of the same is meshed with an idle driven gear 148 on a front wheel drive shaft 147. The subsidiary 1st-speed shift gear 144 is disengageably meshed with the subsidiary 2nd-speed drive gear 136 on the travelling subsidiary counter shaft 134, and is also adapted to be disengageably fitted by spline to the subsidiary 1st-speed driven gear 143 or the subsidiary 3rd-speed driven gear 145.

Figure 6:
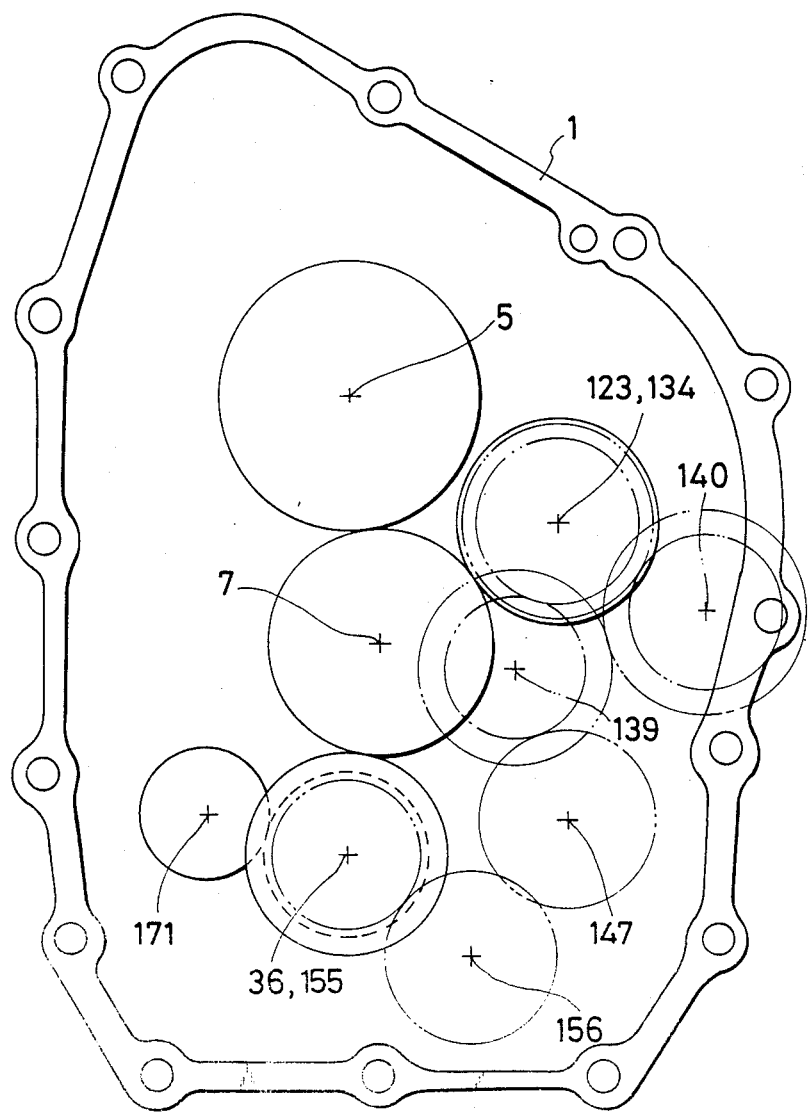
FIG. 6 is a transverse cross-section front view of the same power transmission system of FIG. 5.

The above-described front wheel drive shaft 147 is positioned under the idle shaft 139, as will be seen in FIG. 6, and is rotatably supported from the walls 1a, 1b and 1c of the transmission case 1 and the end wall 2a of the main clutch case 2. The above-mentioned idle driven gear 148 is adapted to be engaged with or disengaged from, the front wheel drive shaft 147 by movement in the axial direction of the selector 149.

Next, description will be made of the PTO drive sub-system, system, the principal elements of which are disposed in the separate subsidiary speed changer case b of the transmission case 1.

On the rear portion of the PTO transmission shaft 36 coupled to the input shaft 5 through the gears 31, 32 and 33 and the PTO clutch 37, is integrally formed a rear output gear 154. Also and also a rear PTO transmission shaft 155 is fitted to the rear portion of the shaft 36 in a relatively rotatable manner. The rear portion of the rear PTO transmission shaft 155 is rotatably supported via a bearing from the rear wall 1c of the transmission case 1.

A PTO counter shaft 156 is rotatably supported from the middle wall 1b and the rear wall 1c of the transmission case 1 under and adjacent to the rear PTO transmission shaft 155. Extending over these shafts 155 and 156, a PTO multi-stage gear speed-changer is formed. That is, on the PTO counter shaft 156 are integrally and successively formed a counter gear 157, a gear 158 and a gear 159, the latter two gears having a smaller diameter than the counter gear 157. On the other hand, around the rear PTO transmission shaft 155 is rotatably fitted a gear 160 which is meshed with the gear 159, and also, fitted by spline, is a shifter gear 161 that is engageable with, and disengageable from, the gear 158.

Furthermore, at the front end of the PTO counter shaft 156 is provided a hydraulic brake 162. This hydraulic brake 162 is composed of a brake housing 163 integrally connected to the middle wall 1b, a brake piston 164 fitted in the brake housing so as to be slidable in the axial direction, brake discs 165 spline-fitted around the PTO counter shaft 156, friction plates 166 locked to the brake housing 163 so as to come into contact with the brake discs 165 in a releasable manner, and a compression coil spring 167 for biasing the brake discs 165 and the friction plates 166 so as to be brought into press contact with each other. A brake chamber 168 formed by the brake housing 163 and the brake piston 164 is communicated with an oil passageway 169 in the PTO transmission shaft 36 and the rear PTO transmission shaft 155. Accordingly, in the case where pressurized oil is not fed through the oil passageway 169, the PTO clutch 37 is disconnected and the hydraulic brake 162 is set in a braking condition, and in the case where pressurized oil is fed through the oil passageway 169, the PTO clutch 37 is connected and the hydraulic brake 162 is set in an unbraking condition.

At the front end of the PTO transmission shaft 36 is integrally secured, by fitting, a front output gear 170. In addition, sideways of and adjacent to the PTO transmission shaft 36 is rotatably supported a front PTO shaft 171 from the front wall 1a of the transmission case 1 and the end wall 2a of the main clutch case 2 via bearings. Around the front PTO shaft 171 is rotatably fitted a gear 172 that is meshed with the front output gear 170. On both the front PTO shaft 171 and the gear 172 is spline-fitted a dog clutch 173, and provision is made such that, when the dog clutch 173 is shifted backwardly, the front PTO shaft 171 and the gear 172 are connected with each other, but when the dog clutch 173 is shifted forwardly, the front PTO shaft 171 and the gear 172 are disconnected.

Figure 5A:
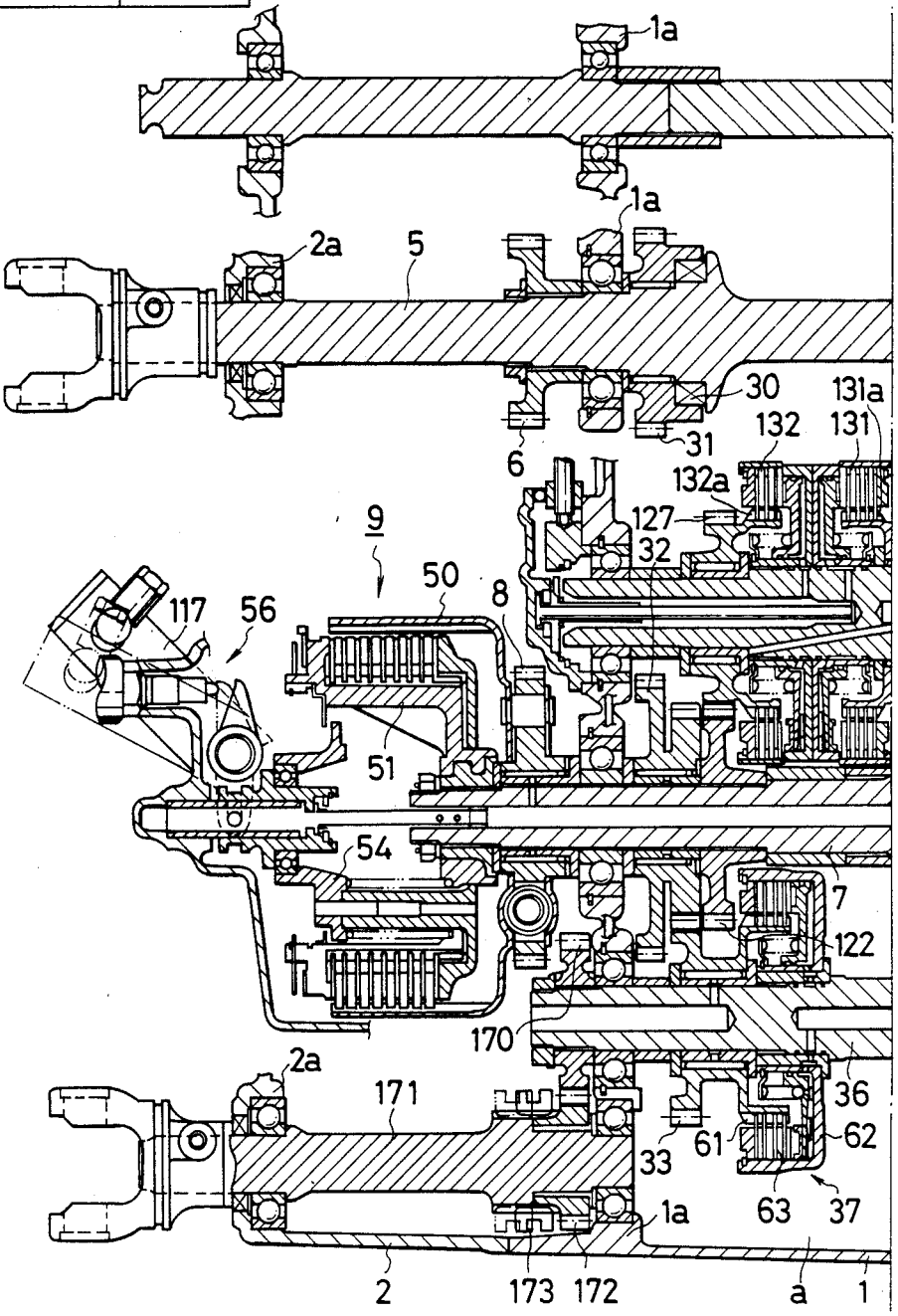
Figure 5B:
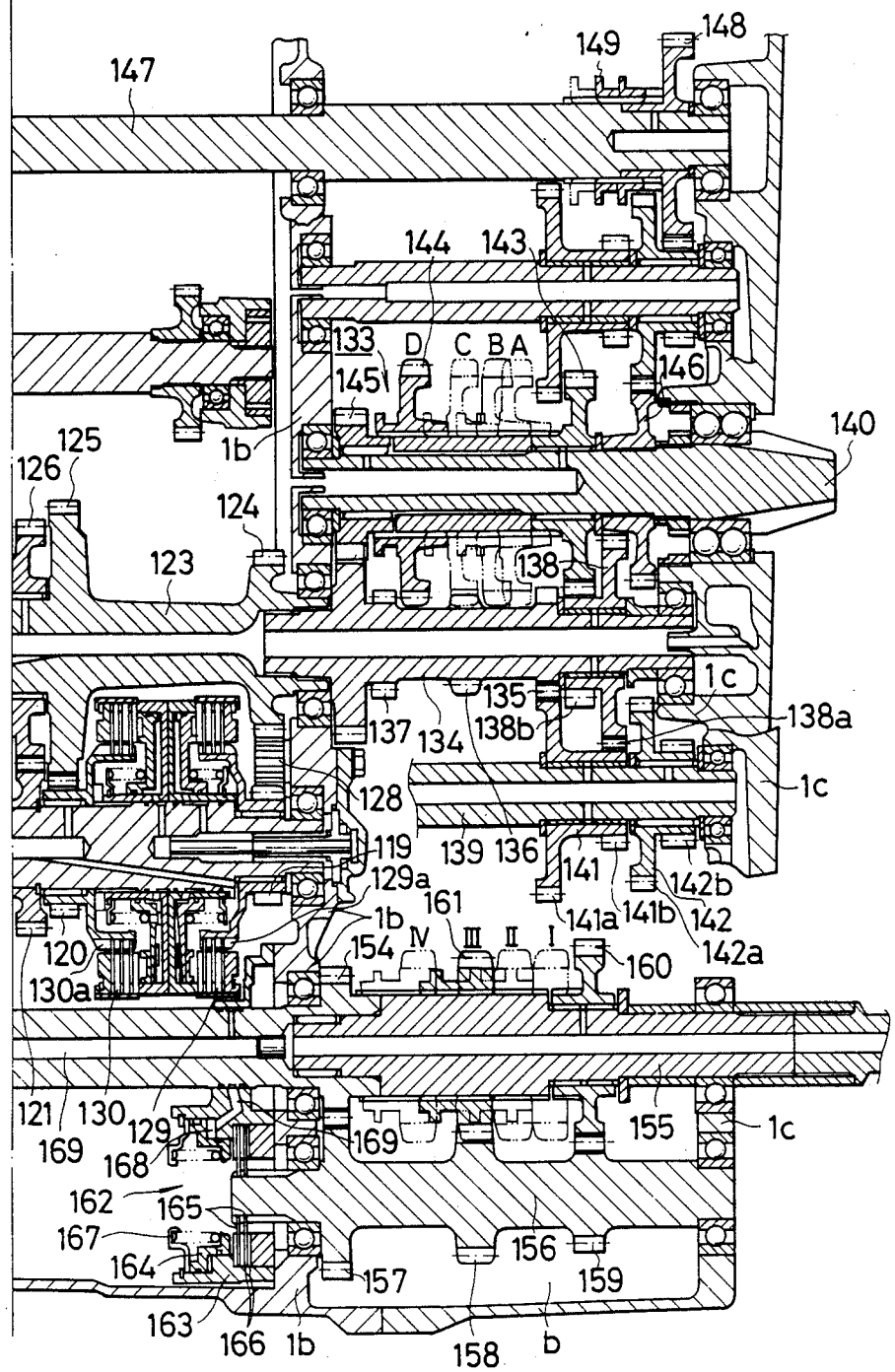

As the preferred embodiment illustrated in FIGS. 5 and 6 is constructed in the above-described manner, in the case where the input shaft 5 is rotationally driven by the engine and the clutch lever 117 in the operating mechanism 56 is not applied with an operating torque in the anticlockwise direction, the main clutch 9 is in a connected state, hence the torque on the input shaft 5 is transmitted through the travelling drive gear 6, the travelling clutch gear 8 and the travelling main clutch 9 to the travelling main shaft 7, and the travelling main shaft 7 is rotationally driven.

Under the rotationally driven condition of the travelling main shaft 7, if pressurized oil is fed to any one of the back travelling hydraulic clutch 129, the 1st-speed hydraulic clutch 130, the 2nd-speed hydraulic clutch 131 and the 3rd-speed hydraulic clutch 132 for connection purposes then the travelling main counter shaft 123 and the travelling subsidiary counter shaft 134 would one of the other of the back travelling, 1st-speed, 2nd-speed or 3rd-speed conditions.

If the clutch lever 117 is pivoted in the anticlockwise direction, the travelling main clutch 9 becomes disconnected and rotation of the travelling main shaft 7 stops.

Under the condition where the travelling main counter shaft 123 and the travelling subsidiary counter shaft 134 are rotationally driven, if the subsidiary 1st-speed shift gear 144 is shifted to the rearmost position A, it becomes spline-connected to the subsidiary 1st-speed driven gear 143, and so, the torque on the travelling subsidiary counter shaft 134 is transmitted to the rear wheel drive shaft 140 through the subsidiary 1st-speed drive gear 135, the idle gear 141, the subsidiary 1st-speed driven gear 143 and the subsidiary 1st-speed shift gear 144.

If the subsidiary 1st-speed shift gear 144 is shifted to the position B in front of the position A, then that gear 144 is not coupled to any gear, and hence the torque on the travelling subsidiary counter shaft 134 is not transmitted to the rear wheel drive shaft 140.

If the subsidiary 1st-speed shift gear 144 is shifted to the position C, which is forwardly of the position B, then the subsidiary 1st-speed shift gear 144 is meshed with the subsidiary 2nd-speed drive gear 136, hence the torque on the travelling subsidiary counter shaft 134 is transmitted to the rear wheel drive shaft 140 through the subsidiary 2nd-speed drive gear 136 and the subsidiary 1st-speed shift gear 144, and the power transmission is set at the subsidiary 2nd-speed. If the subsidiary 1st-speed shift gear 144 is moved to position D to be spline-fitted to the subsidiary 3rd-speed driven gear 145, the power transmission is set at the subsidiary 3rd-speed.

Under the condition where the rear wheel drive shaft 140 is rotated and the rear wheels are driven, if the selector 149 is spline-fitted to the idle driven gear 148, then the front wheel drive shaft 147 also rotates and the front wheels are also rotationally driven. If the selector 149 is disengaged from the idle driven gear 148, then the front wheel drive shaft 147 is disconnected from the rear wheel drive shaft 140, and so, power transmission to the front wheels are cut off.

Under the condition where the input shaft 5 has been rotationally driven, if pressurized oil is fed to the oil passageway 169, then the PTO clutch 37 is connected and, simultaneously therewith, the hydraulic brake 162 is placed in an unbraking state, such that the PTO transmission shaft 36 is rotationally driven.

Under this condition, if the shifter gear 161 is shifted to the rearmost position (I), one of the position (II), the position (III) or the position (IV) forwardly of the position (I), then the gear 160 meshed with the gear 159 is directly coupled to the rear PTO transmission shaft 155 by the shifter gear 161 and the power transmission is set at the PTO 1st speed (in the case of the position (I)). Alternatively, the shifter gear 161 is not coupled to any gear and the power transmission is set at the neutral when the gear is in position (II)), or the shifter gear 161 is meshed with the gear 158 and the power transmission is set at the PTO 2nd speed when the gear is in position (III); or the rear PTO transmission shaft is directly coupled to the PTO transmission shaft 36 by the shifter gear 161 and the power transmission is set at the PTO 3rd speed when the gear is in position (IV).

Under the condition where the PTO transmission shaft 36 is rotationally driven, if the dog clutch 173 is shifted backwardly, then the gear 172 is coupled to the front PTO shaft 171, and this shaft 171 is rotationally driven.

Under the condition where the PTO transmission shaft 36 is rotationally driven in the above-described manner, if the pressurized oil in the oil passageway 169 is discharged, then the PTO clutch 37 becomes cut off, and at the same time, the hydraulic brake 162 is placed in a braking state. Accordingly, even if a drag should remain at the PTO clutch 37 or rotational inertia should act upon the PTO drive sub-system owing to the braking force acting upon the PTO counter shaft 156, the PTO transmission shaft 36, the rear PTO transmission shaft 155 and the front PTO shaft would stop immediately.

In the illustrated embodiment, since the PTO transmission shaft 36 is disposed under the main shaft of the travelling drive sub-system adjacent and parallel thereto, and also since the rear PTO transmission shaft 155 and the PTO counter shaft 156 are disposed under the travelling subsidiary counter shaft 134 in parallel therewith the total length of the power transmission system is reduced and becomes compact.

In addition, since the PTO clutch 37 is positioned between the 2nd-speed drive gear 121 and the 3rd-speed drive gear 122 on the travelling main shaft 7, and since the PTO clutch 37 is disposed on the opposite side to the 2nd-speed hydraulic clutch 131 and the 3rd-speed hydraulic clutch 132 on the travelling main counter shaft 123 with respect to the travelling main shaft 7, the PTO clutch 37 can be disposed close to the travelling main shaft 7 without being interfered by the 2nd-speed hydraulic clutch 131 and the 3rd-speed hydraulic clutch 132, hence the power transmission system can be constructed in a compact form with respect to the vertical and horizontal directions, and the transverse cross-section area of the transmission case can be reduced.

Furthermore, as the PTO counter shaft 156 is disposed in parallel with the rear PTO transmission shaft 155 and the hydraulic brake 162 is disposed at the front end of the same PTO counter shaft, the power for the front PTO shaft can be taken out from the front end portion of the PTO transmission shafts 36 and 155, and the power for the rear PTO shaft can be taken out from the rear end portion of the same.

The arrangement in which the PTO clutch 37 and the PTO multi-stage gear speed-changer are respectively disposed on the PTO transmission shaft 36 at front and rear positions thereof and the hydraulic brake 162 is disposed at the middle position between the PTO clutch and the PTO multi-stage gear speed-changer enables the space within the transmission case to be used effectively. In place of the PTO multi-stage gear speed-changer, including the rear PTO transmission shaft 155 and PTO counter shaft 156 in FIG. 5, there may be provided a power transmission switching apparatus S as shown in FIGS. 2 and 3.

What is claimed is:

1. A power transmission system in a tractor having an engine, a travelling drive system for driving wheels and a PTO drive system for driving working machines, comprising:
  a transmission case longitudinally spaced from said engine,
  a single input shaft provided in a transmission case and connected directly to said engine;
  a travelling main shaft disposed within said transmission case and extending in the longitudinal direction;
  a main clutch provided at the front end of said main shaft and operatively connected to said input shaft for connecting and disconnecting a power transmission route from said input shaft to said main shaft;
  a travelling counter shaft disposed in parallel to said main shaft on either an upper side or a lower side of said main shaft;
  a plurality of clutch speed-changers disposed on both said main shaft and said counter shaft to be operated selectively;
  a PTO transmission shaft disposed in parallel to said main shaft on the opposite side of said counter shaft from said main shaft;
  a PTO clutch provided on said PTO transmission shaft and operatively connected to said input shaft for connecting and disconnected a power transmission route from said input shaft to said PTO transmission shaft; and
  a hydraulic pump provided in said transmission case in direct, cooperatively coupled relation to said input shaft.

2. A power transmission system as claimed in claim 1, wherein between said PTO clutch and said input shaft is interposed a one-way clutch for cutting off torque transmission from the side of said PTO clutch to the side of said input shaft.

3. A power transmission system as claimed in claim 1, wherein said transmission case is partitioned into a main speed-changer case in the front and a subsidiary speed-changer case at the rear, a travelling multi-stage gear hydraulic main speed-changer and said PTO transmission shaft are disposed within said main speed-changer case, and a travelling multi-stage gear subsidiary speed-changer and a PTO multi-stage gear speed-changer connected to said PTO transmission shaft are disposed within said subsidiary speed-changer case.

4. A power transmission system as claimed in claim 3, wherein said PTO clutch is provided at the front end portion of said PTO transmission shaft.

5. A power transmission system in a tractor having a travelling drive system for driving wheels and a PTO drive system for driving working machines, comprising:
  a single input shaft provided in a transmission case and connected to an engine;
  a travelling main shaft disposed within said transmission case as directed in the back and forth directions;
  a main clutch provided at the front end of said main shaft and operatively connected to said input shaft for connecting and disconnecting a power transmission route from said input shaft to said main shaft;
  a travelling counter shaft disposed in parallel to said main shaft on either an upper side or a lower side of said main shaft;
  a plurality of clutch speed-changers disposed on both said main shaft and said counter shaft to be operated selectively;
  a PTO transmission shaft disposed in parallel to said main shaft on the opposite side of said counter shaft from said main shaft;
  a PTO clutch provided on said PTO transmission shaft and operatively connected to said input shaft for connecting and disconnecting a power transmission route from said input shaft to said PTO transmission shaft, wherein a PTO drive gear provided on said input shaft is engaged with a PTO driven gear provided in said PTO clutch via an intermediate gear loosely fitted around said main shaft.

6. A power transmission system as claimed in claim 5, wherein a travelling hydraulic speed-changer clutch is provided at one end of said main shaft, and said PTO clutch is disposed at a middle position in the back and forth directions between said travelling hydraulic speed-changer clutch and said intermediate gear loosely fitted around said main shaft.

7. A power transmission system as claimed in claim 2 in which said main clutch has a clutch inner and a clutch outer, said clutch inner being fixed to the front end of said main shaft and a first transmission member fixed to said input shaft and engaging a second transmission member fixed to said clutch outer and loosely fitted around said main shaft.

8. A power transmission system in a tractor having a travelling drive system for driving wheels and a PTO drive system for driving working machines, comprising:
  a single input shaft provided in a transmission case and connected to an engine;
  a travelling main shaft disposed within said transmission case as directed in the back and forth directions;
  a main clutch provided at the front end of said main shaft and operatively connected to said input shaft for connecting and disconnecting a power transmission route from said input shaft to said main shaft;
  a travelling counter shaft disposed in parallel to said main shaft on either an upper side or a lower side of said main shaft;
  a plurality of clutch speed-changers disposed on both said main shaft and said counter shaft to be operated selectively;
  a PTO transmission shaft disposed in parallel to said main shaft on the opposite side of said counter shaft from said main shaft;
  a PTO clutch provided on said PTO transmission shaft and operatively connected to said input shaft for connecting and disconnecting a power transmission route from said input shaft to said PTO transmission shaft, wherein said main clutch and said PTO clutch are disposed within substantially the same vertical plane in longitudinally spaced relation with respect to each other.

9. A power transmission system as claimed in claim 3 in which said main clutch has a clutch inner and a clutch outer, said clutch inner being fixed to the front end of said main shaft and a first transmission member fixed to said input shaft and engaging a second transmission member fixed to said clutch outer and loosely fitted around said main shaft.

10. A power transmission system in a tractor having a travelling drive system for driving wheels and a PTO drive system or driving working machines, comprising:
  a single input shaft provided in a transmission case and connected to an engine;

a travelling main shaft disposed within said transmission case as directed in the back and forth directions;

a main clutch provided at the front end of said main shaft and operatively connected to said input shaft for connecting and disconnecting a power transmission route from said input shaft to said main shaft;

a travelling counter shaft disposed in parallel to said main shaft on either an upper side or a lower side of said main shaft;

a plurality of clutch speed-changers disposed on both said main shaft and said counter shaft to be operated selectively;

a PTO transmission shaft disposed in parallel to said main shaft on the opposite side of said counter shaft from said main shaft;

a PTO clutch provided on said PTO transmission shaft and operatively connected to said input shaft for connecting and disconnecting a power transmission route from said input shaft to said PTO transmission shaft, wherein a plurality of PTO shafts are connected to said PTO transmission shaft via a power transmission switching apparatus, said transmission case being partitioned into a main speed-changer case in the front and a subsidiary speed-changer case at the rear, said PTO clutch being disposed within said main speed-changer case, and said power transmission switching apparatus being disposed within said subsidiary speed-changer case.

11. A power transmission system in a tractor having a travelling drive system for driving wheels and a PTO drive system for driving working machines, comprising:

a single input shaft provided in a transmission case and connected to an engine;

a travelling main shaft disposed within said transmission case as directed in the back and forth directions;

a main clutch provided at the front end of said main shaft and operatively connected to said input shaft for connecting and disconnecting a power transmission route from said input shaft to said main shaft;

a travelling counter shaft disposed in parallel to said main shaft on either an upper side or a lower side of said main shaft;

a plurality of clutch speed-changers disposed on both said main shaft and said counter shaft to be operated selectively;

a PTO transmission shaft disposed in parallel to said main shaft on the opposite side of said counter shaft from said main shaft;

a PTO clutch provided on said PTO transmission shaft and operatively connected to said input shaft for connecting and disconnecting a power transmission route from said input shaft to said PTO transmission shaft, said transmission case being partitioned into a main speed-changer case in the front and a subsidiary speed-changer case at the rear;

a travelling multi-stage gear subsidiary speed-changer; and a PTO multi-stage gear speed-changer connected to said PTO transmission being disposed within said subsidiary speed-changer case, said PTO multi-stage gear speed-changer being composed of a rear PTO transmission shaft having its front end portion rotatably fitted to the rear end of said PTO transmission shaft provided with said PTO clutch, a PTO counter shaft disposed in parallel to said rear PTO transmission shaft and coupled to said PTO transmission shaft provided with said PTO clutch via gears, and a plurality of gear trains for selectively connecting said rear PTO transmission shaft and said PTO counter shaft.

12. A power transmission system as claimed in claim 11, wherein a braking apparatus is provided on said PTO counter shaft.

13. A power transmission system as claimed in claim 12, wherein said braking apparatus and said PTO clutch are a hydraulic brake and a hydraulic clutch, respectively, these hydraulic brake and hydraulic clutch are simultaneously fed with rpessurized oil or made to discharge pressurized oil through a same hydraulic route, and thereby said hydraulic brake becomes an unbraking state or a braking state, respectively, as interlocked with engagement and disengagement of said hydraulic clutch.

14. A power transmission system in a tractor having a travelling drive system for driving wheels and a PTO drive system for driving working machines, comprising:

a single input shaft provided in a transmission case and connected to an engine;

a travelling main shaft disposed within said transmission case as directed in the back and forth directions;

a main clutch provided at the front end of said main shaft and operatively connected to said input shaft for connecting and disconnecting a power transmission route from said input shaft to said main shaft;

a travelling counter shaft disposed in parallel to said main shaft on either the upper side of the lower side of said main shaft;

a plurality of clutch speed-changers disposed on both said main shaft and said counter shaft to be operated selectively;

a PTO transmission shaft disposed in parallel to said main shaft on the opposite side to said counter shaft with respect to said main shaft; and a PTO clutch provided on said PTO transmission shaft and operatively connected to said input shaft for connecting and disconnecting a power transmission route from said input shaft to said PTO transmission shaft;

a plurality of PTO shafts being connected to said PTO transmission shaft via a power transmission switching apparatus, said transmission case being partitioned into a main speed-changer case in the front and a subsidiary speed-changer case at the rear, said PTO clutch being disposed within said main speed-changer case, and said power transmission switching apparatus being disposed within said subsidiary speed-changer case, wherein at the rear of said PTO transmission shaft is disposed a rear PTO transmission shaft having its end portion held adjacent to said PTO transmission shaft on the same axis, and there being provided a selector gear longitudinally slidable along splines provided on these respective transmission shafts for connecting said respective transmission shafts, and which is engaged with or disengaged from a gear provided on a middle PTO shaft.

15. A power transmission system in a tractor having an engine and a plurality of PTO shafts for respectively driving a plurality of working machines carried by said tractor, said system comprising:

an input shaft connected directly to said engine;

a transmission containing a PTO transmission shaft connected via a PTO clutch to said input shaft for transmitting power to said plurality of PTO shafts; and a power transmission switching apparatus on said PTO transmission shaft for selectively transmitting power from said PTO power transmission shaft to said respective PTO shafts, said PTO clutch being disposed on the input side of said PTO transmission shaft and said power transmission switching apparatus being disposed on the output side thereof.

16. A power transmission system as claimed in claim 15, wherein said transmission case is partitioned into a main speed-changer case in the front and a subsidiary speed-changer case at the rear, said PTO clutch is disposed within said main speed-changer case, and said power transmission switching apparatus is disposed within said subsidiary speed-changer case.

17. A power transmission system as claimed in claim 15, wherein at the rear of said PTO transmission shaft is disposed a rear PTO transmission shaft with its end portion held adjacent to said PTO transmission shaft on the same axis, and there is provided a selector gear which is slidable in the back and forth directions along splines provided on these respective transmission shafts for connecting said respective transmission shaft, and which is engaged with or disengaged from a gear provided on a middle PTO shaft.

18. A power transmission system as claimed in claim 15, wherein between said PTO clutch and said input shaft is interposed a one-way clutch for cutting off torque transmission from the side of said PTO clutch to the side of said input shaft.

19. A power transmission system in a tractor provided with a plurality of PTO shafts for respectively driving a plurality of working machines mounted to a vehicle body; characterized in that within a transmission case is provided a PTO transmission shaft connected via a PTO clutch to an input shaft of said transmission case which is connected to an engine, whereby power is transmitted to said plurality of PTO shafts through said PTO transmission shaft, and wherein a travelling main shaft is disposed adjacent to said PTO transmission shaft and in parallel to said PTO transmission shaft, a travelling hydraulic speed-changer clutch is provided at one end of said travelling main shaft, an intermediate gear for connecting said input shaft to said PTO clutch is loosely fitted around said travelling main shaft, and said PTO clutch is disposed at a longitudinally disposed middle position between said hydraulic speed-changer clutch and said intermediate gear.

20. A power transmission system in a tractor provided with an engine and a plurality of PTO shafts for respectively driving a plurality of working machines mounted to a vehicle body, said system comprising:

a transmission case partitioned into a main speed-changer case in front and a subsidiary speed-changer case in the rear;

a PTO transmission shaft in said transmission case connected via a PTO clutch to an input shaft driven by said engine;

a travelling multi-stage gear hydraulic main speed-changer and said PTO transmission shaft being disposed within said main speed-changer case and a travelling multi-stage gear subsidiary speed-changer and a PTO multi-stage gear speed-changer connected to said PTO transmission shaft being disposed within said subsidiary speed-changer case.

21. A power transmission system in a tractor having an engine, a travelling drive system for driving wheels and a PTO drive system for driving working machines, comprising:

a transmission case longitudinally spaced from said engine;

a single input shaft provided in a transmission case and connected directly to said engine;

a travelling main shaft disposed within said transmission case and extending in longitudinal direction;

a main clutch provided at the front end of said main shaft and operatively connected to said input shaft for connecting and disconnecting a power transmission route from said input shaft to said main shaft;

a travelling counter shaft disposed in parallel to said main shaft on either an upper side or a lower side of said main shaft;

a plurality of clutch speed-changers disposed on both said main shaft and said counter shaft to be operated selectively;

a PTO transmission shaft operatively connected to said input shaft and disposed in parallel to said main shaft on the opposite side to said counter shaft with respect to said main shaft; and a plurality of PTO shafts connected to said PTO transmission shaft via a power transmission switching apparatus;

said transmission case being partitioned into a main speed-changer case in the front and a subsidiary speed-changer case at the rear, and said power transmission switching apparatus being disposed within said subsidiary speed-changer case.

22. A power transmission system in a tractor having a travelling drive system for driving wheels and a PTO drive system for driving working machines, comprising:

a single input shaft having a transmission member fixed thereto provided in a transmission case and connected to an engine;

a travelling main shaft disposed within said transmission case as directed in the back and forth direction;

a main clutch having a clutch outer and clutch inner, said clutch inner being fixed to said main shaft at the front end thereof, said main clutch being operatively connected to said input shaft for connecting and disconnecting a power transmission route from said input shaft to said main shaft;

a transmission member engaged by said input shaft transmission member fixed to said clutch outer and loosely fitted around said main shaft;

a travelling counter shaft disposed in parallel to said main shaft on either an upper side or a lower side of said main shaft;

a plurality of clutch speed-changes disposed on both said main shaft and said counter shaft to be operated selectively; and a PTO transmission shaft disposed in parallel to said main shaft on the opposite side to said counter shaft with respect to said main shaft;

said transmission case being partitioned into a main speed-changer case in the front and a subsidiary speed-changer case at the rear, a travelling multi-stage gear hydraulic main speed-changer and said PTO transmission shaft being disposed within said main speed-changer case, and a travelling multi-stage gear subsidiary speed-changer and a PTO multi-stage gear speed-changer connected to said PTO transmission shaft being disposed within said subsidiary speed-changer case.

23. A power transmission system as claimed in claim 22, wherein said PTO multi-stage gear speed-changer is composed of a rear PTO transmission shaft having its front end portion rotatably fitted to the rear end of said PTO transmission shaft, a PTO counter shaft disposed in parallel to said rear PTO transmission shaft and coupled to said PTO transmission shaft via gears, and a plurality of gear trains for selectively connecting said rear PTO transmission shaft and said PTO counter shaft.

24. A power transmission system in a tractor provided with a plurality of PTO shafts for respectively driving a plurality of working machines mounted to a vehicle body; characterized in that within a transmission case is provided a PTO transmission shaft connected to an input shaft of said transmission case which is connected to an engine, and power is transmitted to said plurality of PTO shafts through said PTO transmission shaft, said transmission case is partitioned into a main speed-changer case in the front and a subsidiary speed-changer case at the rear, a travelling multi-stage gear hydraulic main speed-changer and said PTO transmission shaft are disposed within said main speed-changer case, and a travelling multi-stage gear subsidiary speed-changer and a PTO multi-stage gear speed-changer connected to said PTO transmission shaft are disposed within said subsidiary speed-changer case.

25. A power transmission system as claimed in claim 24, wherein said PTO multi-stage gear speed-changer is composed of a rear PTO transmission shaft having its front end portion rotatably fitted to the rear end of said PTO transmission shaft, a PTO counter shaft disposed in parallel to said rear PTO transmission shaft and coupled to said PTO transmission shaft via gears, and a plurality of gear trains for selectively connecting said rear PTO transmission shaft and said PTO counter shaft.

26. A power transmission system in a tractor provided with a plurality of PTO shafts for respectively driving a plurality of working machines mounted to a vehicle body, comprising:
- an input shaft provided in a transmission case and connected to an engine;
- a PTO transmission shaft operatively connected to said input shaft;
- a PTO clutch provided on said PTO transmission shaft at a front position thereof for connecting and disconnecting a power transmission route from said input shaft to said PTO transmission shaft;
- a power transmission switching apparatus provided on said PTO transmission shaft at a rear position thereof which can selectively transmit power to said respective PTO shafts; and
- a braking apparatus provided on said PTO transmission shaft at a middle position in the back and forth directions which can brake said PTO transmission shaft.

27. A power transmission system in a tractor provided with a PTO shaft for driving a working machine mounted to a vehicle body, comprising:
- an input shaft provided in a transmission case and connected to an engine;
- a PTO transmission shaft operatively connected to said input shaft;
- a PTO clutch provided on said PTO transmission shaft at a front position thereof for connecting and disconnecting a power transmission route from said input shaft to said PTO transmission shaft;
- a PTO multi-stage gear speed-changer provided on said PTO transmission shaft at a rear position thereof; and
- a braking apparatus provided on said PTO transmission shaft at a middle position in the back and forth directions which can brake said PTO transmission shaft.

* * * * *

UNITED STATES PATENT AND TRADEMARK OFFICE
CERTIFICATE OF CORRECTION

PATENT NO.  : 4,938,085
DATED       : July 3, 1990
INVENTOR(S) : T. Suzuki et al.

It is certified that error appears in the above-identified patent and that said Letters Patent is hereby corrected as shown below:

In claim 7 (column 14, line 20), delete "2" and insert therefor -- 5 --.

In claim 9 (column 14, line 58), delete "3" and insert therefor -- 8 --.

In claim 13 (column 16, line 15), delete "rpessurized" and insert therefor -- pressurized --.

Signed and Sealed this

Twenty-eighth Day of April, 1992

Attest:

HARRY F. MANBECK, JR.

*Attesting Officer*     *Commissioner of Patents and Trademarks*